United States Patent
Joshi

(10) Patent No.: US 9,805,388 B2
(45) Date of Patent: Oct. 31, 2017

(54) PREMIUM INSTANT MESSAGING SPACE

(75) Inventor: Rekha Joshi, Bangalore (IN)

(73) Assignee: EXCALIBUR IP, LLC., Sunnyvale, CA (US)

( * ) Notice: Subject to any disclaimer, the term of this patent is extended or adjusted under 35 U.S.C. 154(b) by 317 days.

(21) Appl. No.: 13/297,774

(22) Filed: Nov. 16, 2011

(65) Prior Publication Data

US 2013/0124343 A1  May 16, 2013

(51) Int. Cl.
 *G06Q 10/00* (2012.01)
 *G06Q 30/02* (2012.01)
 *H04L 12/18* (2006.01)

(52) U.S. Cl.
 CPC ..... *G06Q 30/0241* (2013.01); *H04L 12/1822* (2013.01)

(58) Field of Classification Search
 CPC .................. G06Q 30/0241; H04L 12/1822
 USPC ....................................... 705/14.73
 See application file for complete search history.

(56) References Cited

U.S. PATENT DOCUMENTS

| | | | | |
|---|---|---|---|---|
| 8,375,097 | B2* | 2/2013 | Lawler et al. ................. | 709/206 |
| 2006/0143066 | A1* | 6/2006 | Calabria ........... | G06F 17/30867 705/7.29 |
| 2006/0143067 | A1* | 6/2006 | Calabria ................ | G06Q 10/10 705/26.1 |
| 2006/0143068 | A1* | 6/2006 | Calabria ............ | G06Q 30/0603 705/26.61 |
| 2006/0259415 | A1* | 11/2006 | Satsukawa ............. | G06Q 40/04 705/37 |
| 2007/0083437 | A1* | 4/2007 | Hamor ................... | G06Q 30/00 705/26.1 |
| 2009/0076978 | A1* | 3/2009 | Dayan .......................... | 705/36 R |
| 2009/0210291 | A1* | 8/2009 | Safar .............................. | 705/10 |
| 2010/0205539 | A1* | 8/2010 | Gestsson et al. ............. | 715/752 |
| 2011/0112912 | A1* | 5/2011 | Wu ......................... | G06Q 10/10 705/14.73 |
| 2011/0238497 | A1* | 9/2011 | Milne et al. ................ | 705/14.49 |
| 2012/0246021 | A1* | 9/2012 | Hamor ................... | G06Q 30/08 705/26.3 |
| 2012/0324507 | A1* | 12/2012 | Weber ............................ | 725/37 |
| 2013/0073366 | A1* | 3/2013 | Heath ................ | G06Q 30/0261 705/14.25 |

OTHER PUBLICATIONS

Wauter, Robin. So How Much Time Do You Waste on Twitter?, Dec. 14, 2008, techcrunch.com, 1-5.*

* cited by examiner

*Primary Examiner* — Beth V Boswell
*Assistant Examiner* — Joseph Waesco
(74) *Attorney, Agent, or Firm* — Cooper Legal Group, LLC

(57) ABSTRACT

Monetizing on-line communications includes: assigning a price to become a buddy of a publisher in an on-line chat board; advertising the price to prospective subscribers of the publisher; receiving a bid from a prospective subscriber; and transmitting the bid offer to the publisher such that the publisher can accept or decline the bid offer.

20 Claims, 7 Drawing Sheets

200

```
┌─────────────────────────────────────────────────────────────┐
│                                                             │
│           Welcome to the IM Space Bidding Tool              │
│  ─────────────────────────────────────────────────────────  │
│                                                             │
│   Select IM Space:                                          │
│                                                             │
│          ┌─────────────────────────────────────┐            │
│          │  ○      Bolt                        │            │
│          │  ●      POTUS                       │            │
│          │  ○      Smiley123                   │            │
│          └─────────────────────────────────────┘            │
│                                                             │
│   ┌───────────────────────────────────────────────────┐     │
│   │ Select Bid PRICE:                                 │     │
│   │                           ┌────────┐       250    │     │
│   │  ○   Current Price Amount │ $4.00  │              │     │
│   │                           └────────┘              │     │
│   │                        ┌─────┬─────┬────────┐     │     │
│   │                        │  ↑  │  ↓  │ $3.80  │     │     │
│   │  ●   Enter New Price:  └─────┴─────┴────────┘     │     │
│   └───────────────────────────────────────────────────┘     │
│                                                             │
│             ┌──────────┐         ┌──────────┐               │
│             │  SUBMIT  │         │  CANCEL  │               │
│             └──────────┘         └──────────┘               │
└─────────────────────────────────────────────────────────────┘
```

```
┌─────────────────────────────────┐
│ Receiving a request to monetize │
│      an IM space for a          │
│          publisher.             │
│             410                 │
└─────────────────────────────────┘
                ↓
┌─────────────────────────────────┐
│  Assigning a price to the IM    │
│            space.               │
│             420                 │
└─────────────────────────────────┘
                ↓
┌─────────────────────────────────┐
│ Advertising the price to        │
│     prospective subscribers.    │
│             430                 │
└─────────────────────────────────┘
                ↓
┌─────────────────────────────────┐
│  Receiving an offer from a      │
│     prospective subscriber.     │
│             440                 │
└─────────────────────────────────┘
                ↓
┌─────────────────────────────────┐
│ Transmitting the offer to the   │
│          publisher.             │
│             450                 │
└─────────────────────────────────┘
                ↓
┌─────────────────────────────────┐
│ Receiving an indication of      │
│ acceptance of the offer;        │
│ receiving a percentage.         │
│             460                 │
└─────────────────────────────────┘
                ↓
┌─────────────────────────────────┐
│       Storing the price.        │
│             470                 │
└─────────────────────────────────┘
```

*FIG. 4*

PREMIUM INSTANT MESSAGING SPACE

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of Instant Messaging, and more particularly relates to the field of monetizing Instant Messaging.

BACKGROUND OF THE INVENTION

Instant Messaging ("IM") is a real-time on-line communication between individuals, each at different computers. It falls under the umbrella of "on-line chatting" and is wildly popular because of its ease of use. An IM user can instantly receive messages from any "buddy" at any time as long as she/he is on-line. This is a double-edged sword, however, as many different buddies may be vying for your attention/comments/knowledge and this can be distracting and annoying.

There is a need for a system and method to encourage more meaningful messaging, as well as to discourage idle chatting.

SUMMARY OF THE INVENTION

Briefly, according to an embodiment of the invention a method for monetizing on-line communications includes steps or acts of: assigning a price to become a buddy of a publisher in an on-line chat board; advertising the price to prospective subscribers of the publisher; receiving a bid from a prospective subscriber; and transmitting the bid offer to the publisher such that the publisher can accept or decline the bid offer.

The method further includes providing an on-line marketplace for holding auctions for the IM space of the publisher. The on-line marketplace provides a search tool and trending data.

According to another embodiment of the present invention, a system for monetizing IM space includes: a memory with instructions stored therein, and a processor device for executing the instructions. The instructions include: assigning a price to become a buddy of a publisher in an on-line chat board; advertising the price to prospective subscribers of the publisher; receiving a bid from a prospective subscriber; and transmitting the bid offer to the publisher such that the publisher can accept or decline the bid offer.

The system further includes an on-line interface for holding auctions for the IM space of the publisher. The on-line marketplace provides a search tool and trending data.

According to another embodiment of the present invention, a computer program product that includes a computer-readable storage medium, such as a DVD-ROM, can include the instructions for monetizing IM space.

The method can also be implemented as machine executable instructions executed by a programmable information processing system or as hard coded logic in a specialized computing apparatus such as an application-specific integrated circuit (ASIC).

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which:

FIG. 2 is an exemplary IM Space bidding interface, according to an embodiment of the present invention;

FIG. 4 is a flowchart of a method according to an embodiment of the present invention;

Figure 1:
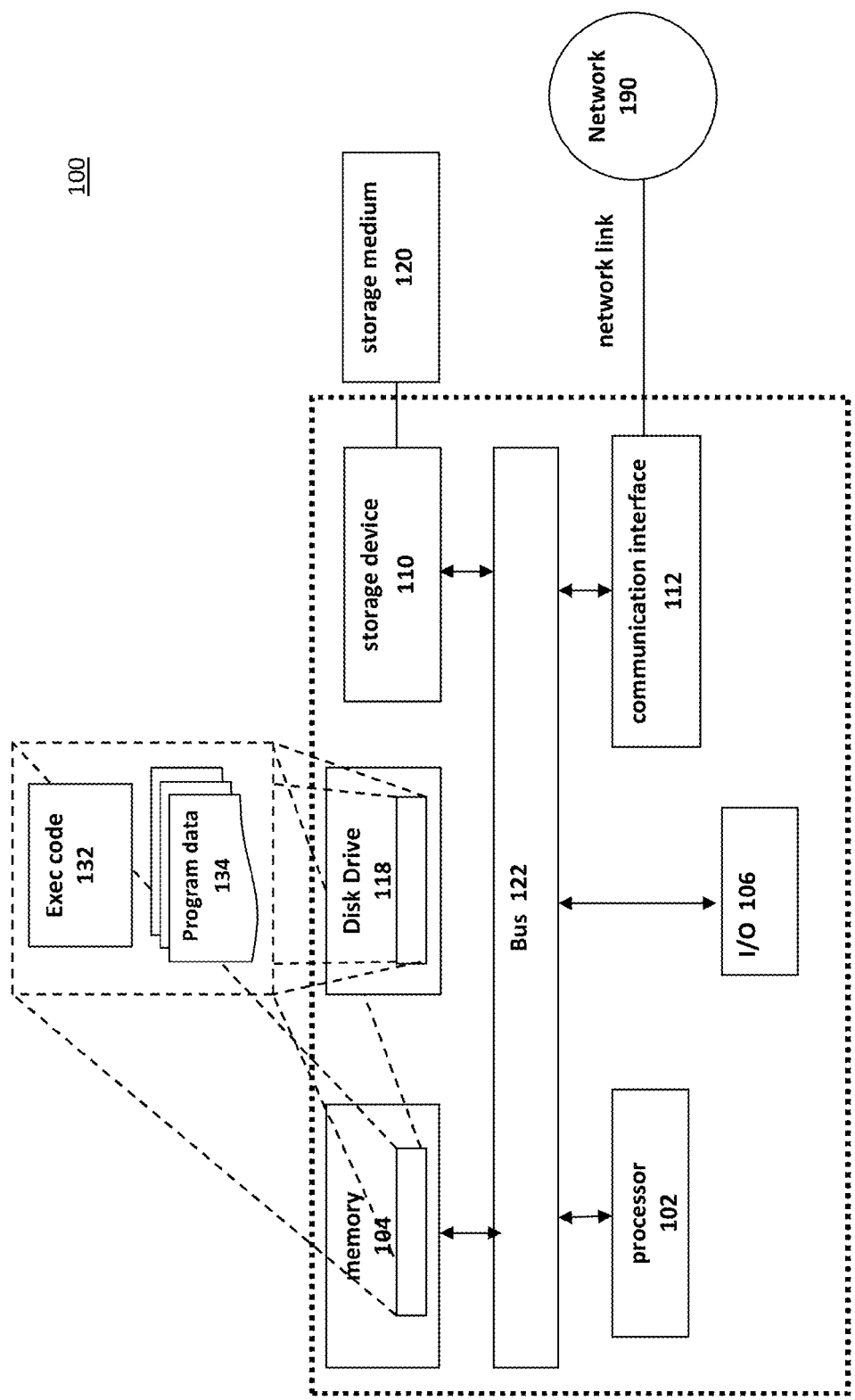
FIG. 1 is a high level block diagram showing an information processing system configured to operate according to an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Before describing in detail embodiments that are in accordance with the present invention, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Computer-Implemented System.

Referring now in specific detail to the drawings, and particularly FIG. 1, there is provided a simplified pictorial illustration of an information processing system in which the present invention may be implemented. For purposes of this invention, computer system 100 may represent any type of computer, information processing system or other programmable electronic device, including a client computer, a server computer, a portable computer, an embedded controller, a personal digital assistant, and so on. The computer system 100 may be a stand-alone device or networked into a larger system. Computer system 100, illustrated for exemplary purposes as a networked computing device, is in communication with other networked computing devices (not shown) via network 110. As will be appreciated by those of ordinary skill in the art, network 110 may be embodied using conventional networking technologies and may include one or more of the following: local area networks, wide area networks, intranets, public Internet and the like.

Throughout the description herein, an embodiment of the invention is illustrated with aspects of the invention embodied solely on computer system 100. As will be appreciated by those of ordinary skill in the art, aspects of the invention may be distributed amongst one or more networked computing devices which interact with computer system 100 via one or more data networks such as, for example, network 110. However, for ease of understanding, aspects of the invention have been embodied in a single computing device—computer system 100.

Computer system 100 includes processing device 102 which communicates with input/output subsystem 106 and network 190. The processor 102 is connected to a communication infrastructure 122 (e.g., a communications bus, cross-over bar, or network). The processor device 102 may be a general or special purpose microprocessor operating under control of computer program instructions executed from memory 104. The processor may include a number of special purpose sub-processors, each sub-processor for executing particular portions of the computer program instructions. Each sub-processor may be a separate circuit able to operate substantially in parallel with the other sub-processors. Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips. The memory may be partitioned or otherwise mapped to reflect the boundaries of the various memory subcomponents.

Memory 104 includes both volatile and persistent memory for the storage of: operational instructions for execution by processor device 102, data registers, application storage and the like. Memory 104 preferably includes a combination of random access memory (RAM), read only memory (ROM) and persistent memory such as that provided by a hard disk drive. The computer instructions/applications stored in memory 104 and executed by processor 102.

The I/O subsystem 106 may include various end user interfaces such as a display, a touch screen, a keyboard, a mouse, an imaging system, and the like. The I/O subsystem 106 may further include a connection to a network 190 such as a local-area network (LAN) or wide-area network (WAN) such as the Internet through communication interface 112. Similarly, output devices may include displays, information display unit printers and the like. Additionally, combination input/output (I/O) devices may also be in communication with processing system 102. Examples of conventional I/O devices include removable and fixed recordable media (e.g., floppy disk drives, tape drives, CD-ROM drives, DVD-RW drives, etc.), touch screen displays and the like.

Communications interface 112 allows software and data to be transferred between the computer system and external devices, such as databases. Examples of communications interface 112 may include a modem, a network interface (such as an Ethernet card), a communications port, a PCMCIA slot and card, etc.

Computer-executable program code 132 for carrying out the instructions for implementing the IM pricing system as described below can be stored in the memory 104 and/or the disk drive 118. Likewise, program data 134 can be also be stored in memory 104 and/or disk drive 118. The program data 134 is also likely to be stored remotely in a database to be accessed by the IM pricing system 100.

Descriptions of Embodiments.

We describe a novel method for monetizing IM space. We set a valuation on IM space by placing a premium on the IM space of highly sought-after IM accounts (publishers). In one embodiment, we implement bidding in order to be included in someone's IM space (become a "buddy" of). The business model we propose will include an IM space stock ticker, shown in FIG. 3. This creates new avenues for revenue and more closely meets people's needs. Anyone who can bid and win gets a slot on his/her favored "buddy" lists. Presumably, those who value buddy status enough to pay for it will not squander the opportunity with idle, meaningless messages ("hey," "what's up?"). In this manner one can have access to the IM/Chat boards of professionals, doctors, publishers, actors, consultants, celebrities. In general, one can gain access to experts in any domain. At the same time, the favored expert is acquiring a buddy who values his/her attention enough to pay for it.

In the bidding embodiment, the bidding commences with a minimum bid amount. This minimum bid amount can be set by the publisher or it can be set by the chat provider. The bidding process culminates after a predetermined period of time. If no time is set, a default time (for example, seven minutes) can be used. An announcement of an upcoming auction would be featured on IM boards.

Access to the IM list of sought-after individuals is valued at a premium. In the alternative, anyone can assign a premium bid amount to his/her IM account and "test the market." We let the market decide what access to an IM account is worth. Modeled after the stock market, the IM accounts that are perceived to be more valuable will hold or increase their price; whereas the IM accounts for the less popular individuals will decrease.

The worth of the IM account access is determined by the bidder and bidding pattern. Historical bid data can provide an indication of the increase and decrease in the perceived worth of the IM space, and a future estimation of an IM value. The statistical inference can be obtained by mean, variance and standard deviation on the data points. If we observe three months' worth of data we will get ~90 days worth of bidding pattern. The data points are $x_1, \ldots, x_n$, taken from the population. The (sample) mean is:

$$\bar{x} = \frac{1}{n}\sum_{i=1}^{n} x_i.$$

The variance $s^2$ is a kind of average of the squared deviations from the mean:

$$s^2 = \frac{1}{n-1}\sum_{i=1}^{n}(x_i - \bar{x})^2$$

Standard deviation is a measure that identifies the spread in a set of bid values and indicates how the IM ticker is fluctuating. If the standard deviation is large it indicates the fluctuation is greater.

$$\sigma_x = \sqrt{\frac{\sum(x_i - \bar{x})^2}{N}}.$$

A continuous moving average figure indicates the bid pattern relevant to the last n days. This is simply a rolling daily average going back the number of days for which we want to calculate the average:

$$Xr = 1/n\sum_{r=1}^{n} Xr$$

Figure 3:
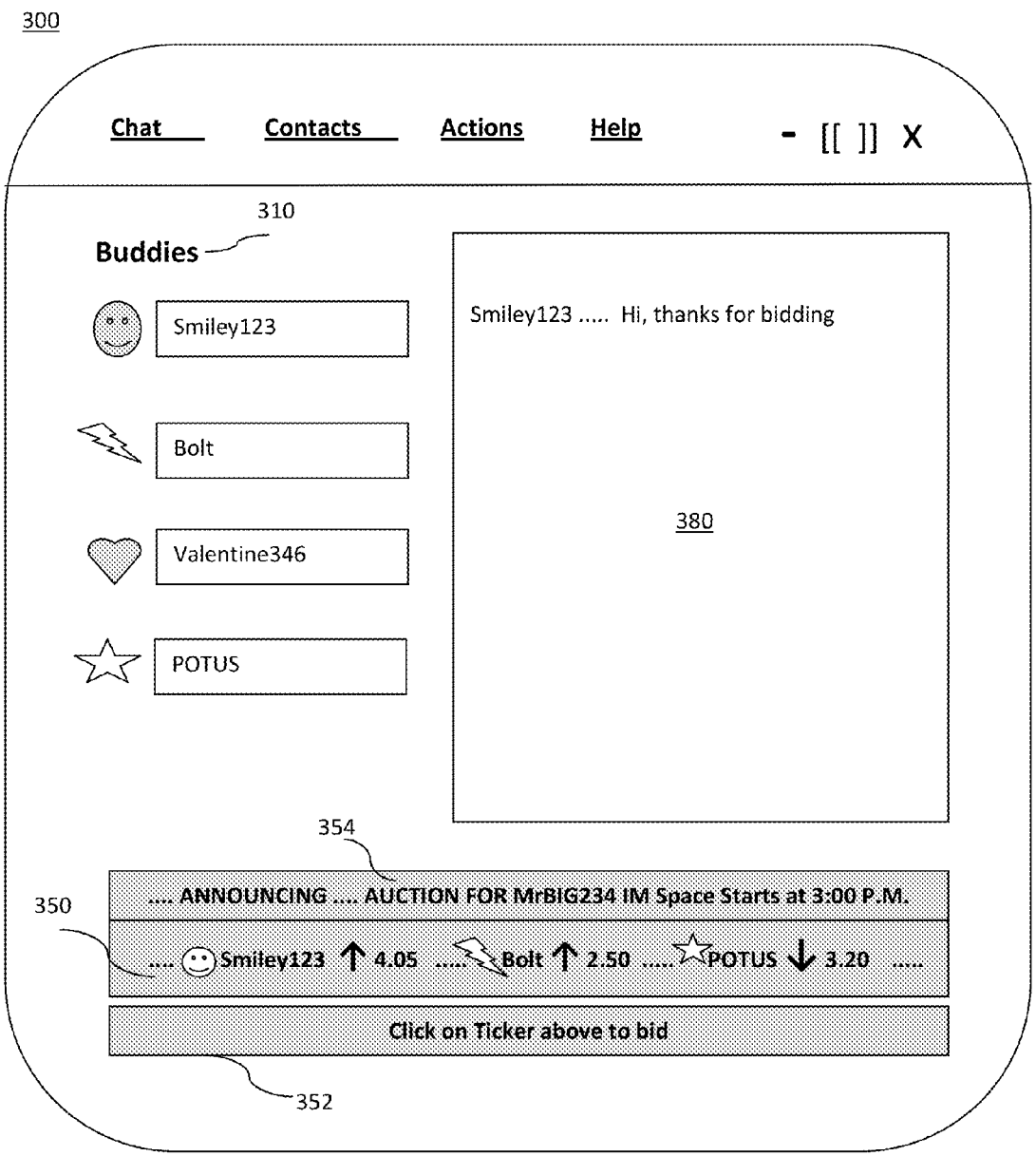
FIG. 3 is an exemplary IM board showing a ticker-tape, according to an embodiment of the present invention.

Fluctuations will occur as the perceived worth of "IM access" to premium accounts fluctuates. Just like the stock market, the IM stock price varies on a daily basis and includes a stock ticker displayed on the user's IM board. FIG. 3 shows an exemplary IM board 300 with a listing of Buddies 310 (or contacts) and a message space 320 for receiving messages and inputting messages. Here you see a message received from Smiley123. In addition to the usual items that are common to most IM boards, the IM board 300 of FIG. 3 has a pseudo ticker-tape 350 running along the bottom. The ticker-tape 350 displays the current pricing of premium IM message space and an indicator of whether the price is dropping or increasing. An announcement tape 354 runs along the board, informing the user of an upcoming auction for the IM space of MrBIG234.

The user is able to monitor the announcements and the price ticker tape and when the time is right, he/she can purchase and/or sell IM space. In this example, the user enters the IM MarketPlace by selecting a bar 352 associated with the ticker-tape 350. In an alternative embodiment, the user can simply click or touch the ticker-tape 350 itself to enter the IM MarketPlace. Because the user has already logged in to activate his/her IM board 300, he/she can go directly to the IM MarketPlace from the board 300.

Selecting the bar 352 or clicking or touching the ticker-tape 350 will trigger the display of a window or overlay 200. Here the user can select the IM space for bidding. In this window 200 the user can see the current price offering and submit a bid for that amount. In the alternative, the user can use a tool 250 provided by the interface to increase or decrease the bid amount. Here we show arrow icons 250 which, when selected by the user, increment or decrement the price by a pre-set amount. The tool 250 could also be presented as an input field where the user types in a price.

Figure 5:
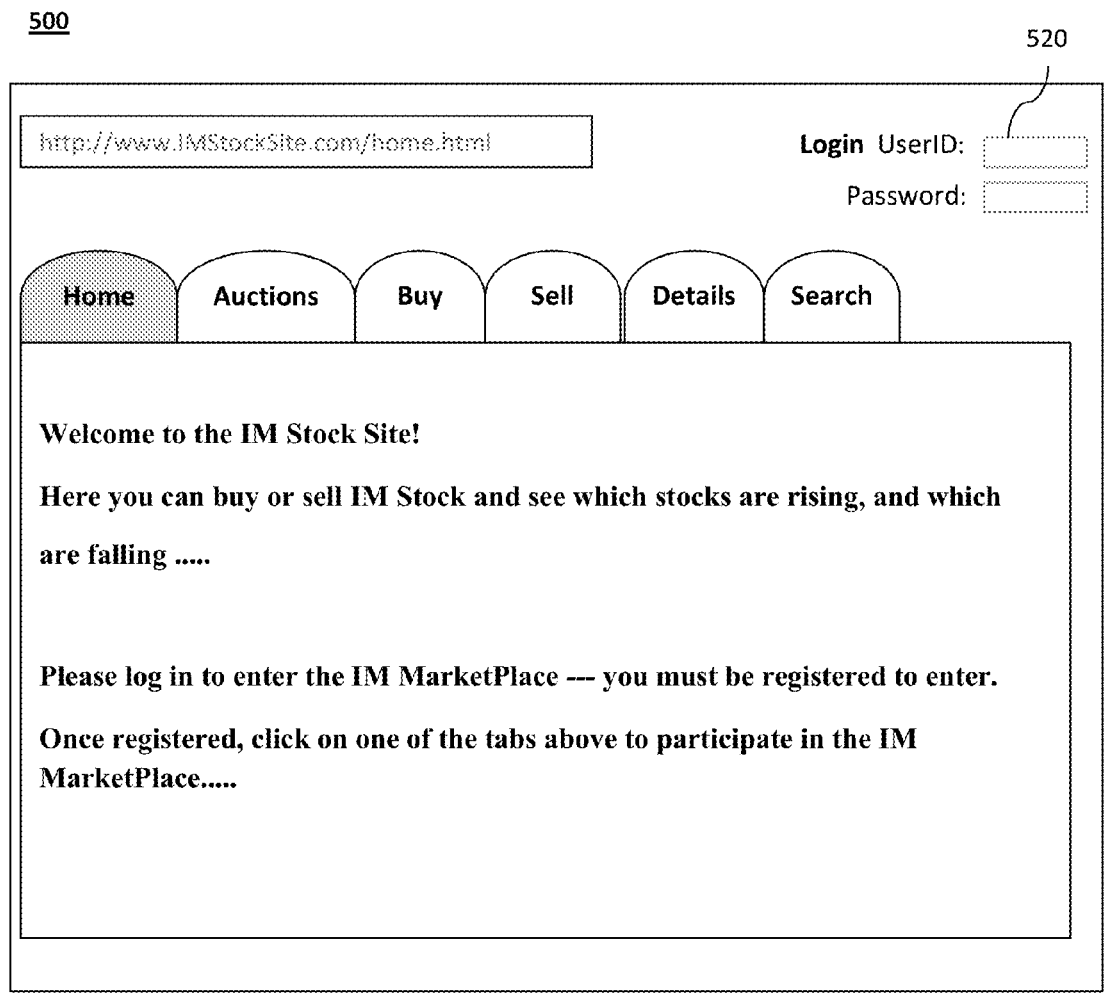
FIG. 5 is an exemplary IM market place interface, according to an embodiment of the present invention.
Figure 6:
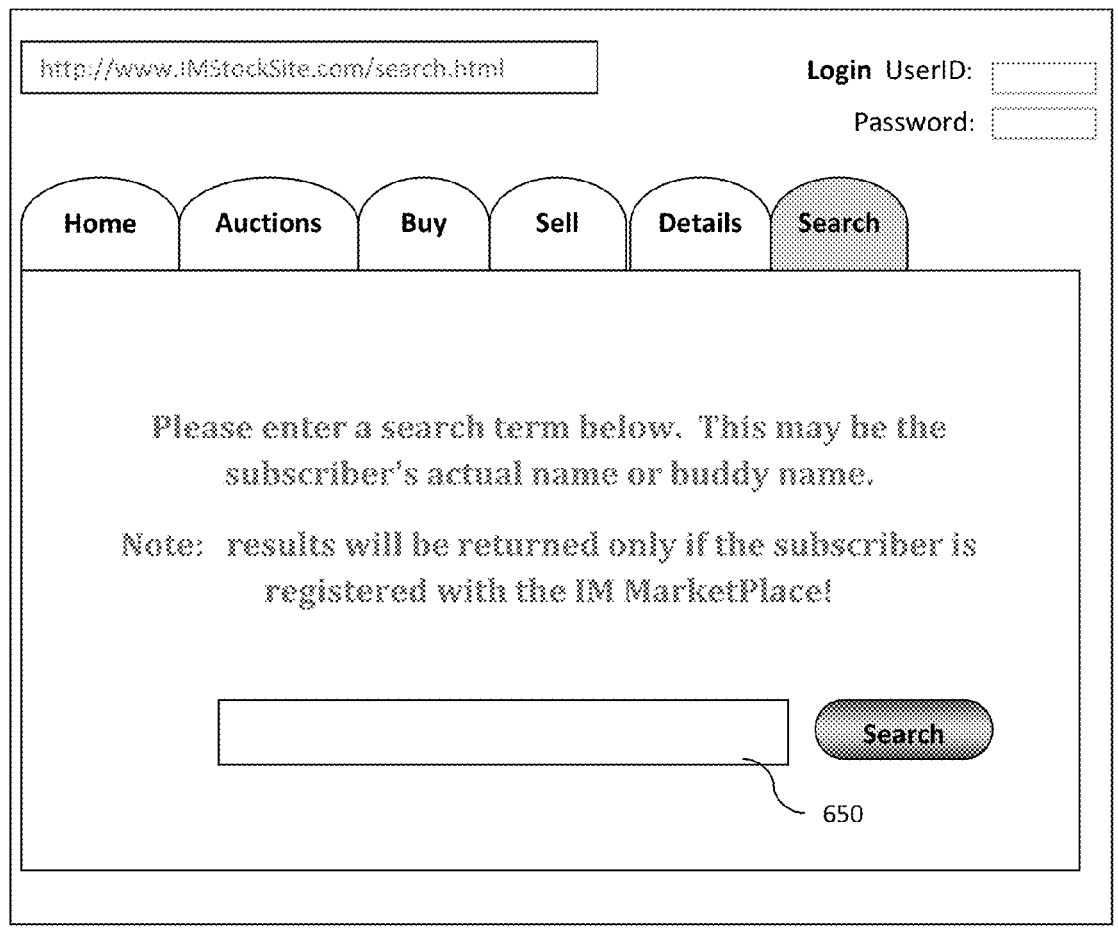
FIG. 6 is an exemplary web page of the search as provided by the IM Space bidding interface, according to an embodiment of the present invention.

If the user's IM board is not active, the user can still participate in the IM MarketPlace by logging into a site that provides the details of various IM boards and prices, similar to the floor of the stock market. The user can buy/sell at this site, shown in FIG. 5. The IM stock site 500 is maintained by the chat provider and provides a buy/sell interface, along with details of the various stocks within the IM market place. In order to view the details and to participate in the market place, the user must first register and log in to the site. The log-in is shown at 520. Once logged in, the user is able to search for subscribers within the IM MarketPlace at screen 600. The user simply inputs the subscriber's actual name or "buddy" name in the search bar 650.

The range for bidding can be anywhere from a few cents to large dollar amounts. The information that this provides can exceed any monetary windfall. The bidding allows publishers, chat providers and advertisers to gain an idea of what/who really interests people so much that they are willing to put their money on it. For example, are people more interested in the IM accounts of Hollywood celebrities, book authors, politicians, doctors, or artists? We can note who/what is trending now and store this information. An accumulation of trending data over time will also reflect what was important for a generation. This will be of immense help in targeting audiences.

Figure 7:
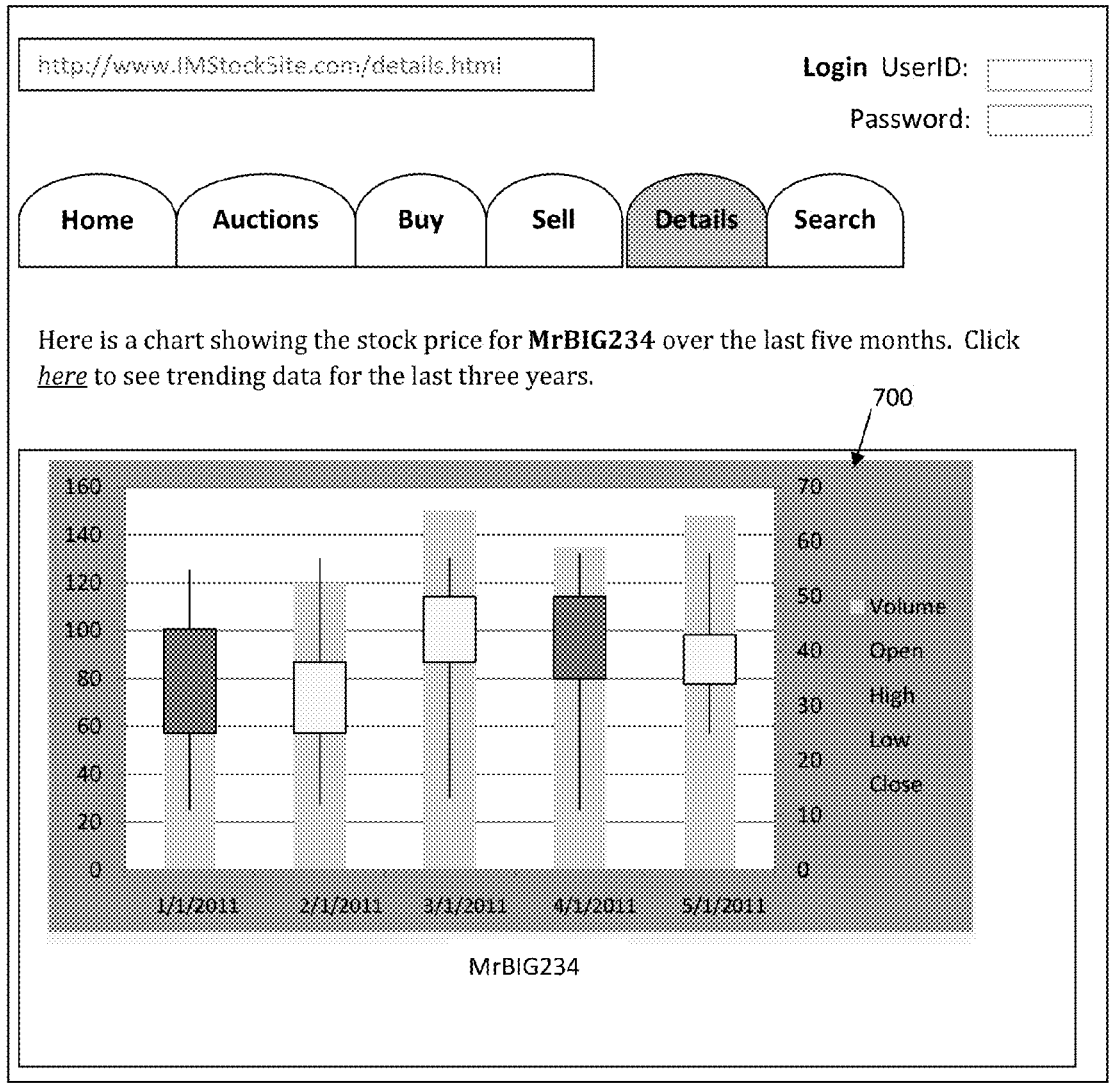
FIG. 7 is an exemplary web page showing trending data, according to an embodiment of the present invention.

To set a price, we can use current trending information and/or current events, or receive a price from the IM publisher. For example, historical data will show that in an election year we should set a higher value on the IM accounts of political candidates and political spokespeople. The IM account of a heart specialist would command a high price because of the number of people suffering from heart disease. Trending data would show that an economist would command a high price during times of economic crisis, but not during a stable economy. We can also trade access to IM accounts in much the same way that shares of stock are traded. We can buy/sell, cut losses, make profits, and so forth. FIG. 7 shows a graph 700 generated with a stock's pricing over a period of time.

Referring now to FIG. 4, we show a flowchart 400 of a method for monetizing IM space, according to an embodiment of the present invention. First, in step 410 the chat provider receives a request from a publisher, the request indicating that the publisher wishes to assign a price to his/her IM space. In step 420 a price is assigned.

A price can be assigned in several ways. The simplest way is for the publisher to set the price. Let's say POTUS decides that someone will pay $4.00 to become his buddy. POTUS lets the chat provider know that this is the price to advertise and then POTUS monitors the ticker tape 350 to see if there are any sales. This is one way to "test the market," Here in FIG. 3 we see that POTUS's IM space is currently priced at $3.20, a drop from the previously-set price of $4.00. This indicates that POTUS's IM space did not sell at $4.00 and after a pre-determined time period, the price was decremented by an also pre-determined amount. If no sales are forthcoming during the time period selected by POTUS, there is an option for maintaining the minimum bid price or removing the IM space from the ticker-tape. A price will drop after a period of time with no sales.

Referring again to FIG. 2, we show the exemplary IM Space bidding interface 200 that the user sees after selecting the bar 352 from FIG. 3. Here the user is able to select the IM space on which to bid and also to select the bidding amount. Once a price is selected, the price is advertised to prospective subscribers in step 430. The price can be advertised as shown in FIG. 3 or by selecting this as an option on the Instant Messaging window.

Additionally, the user can log in to a site 500 that provides the details and advertises the prices, including the minimum bid price and the current selling price, and whether the price is rising or falling, with pictorial representation. In step 440 the chat provider receives an offer from someone who wants to purchase the IM space of the publisher. This offer can be for the exact price, or it can be a "bid" that is lower than, equal to, or higher than the stated price. It is not up to the chat provider to accept or decline the offer, so the chat provider transmits the offer to the publisher in step 450. However, the chat provider has a superseding power to overrule the request and the bid (can be used five times in the lifetime of the stock). It follows the stock-granting pattern as followed by the companies. If you apply and there is overwhelming demand, they allot you only partial stock, or have a right to not allocate any at all.

If the offer is accepted, the chat provider receives an indication that the deal went through in step 460. Additionally, the chat provider can receive a commission from the deal. The commission can be a percentage of the price or a fixed amount. The chat provider stores this price, along with an identifier for both the subscriber and the publisher. The chat provider may use this stored information to refine a target audience for advertising.

Advantages

For the subscribers the advantage is that they get to be IM "buddies" with prized individuals and receive common digests, messages, and knowledge from the experts/people they would like to hear from. The publishers get to earn money/points/ego boost for their popularity, knowledge. Additionally, by charging for the opportunity for a real-time chat, the publishers will cut down on the number of distracting instant messages and deal with people who have something important to say.

For each bid/sale transaction, the chat provider gets a cut for each deal. The chat provider, which is usually a search engine, will be able to charge a percentage for each "trade." For each connection made, there has been deliberate thought from subscribers, especially since there is money involved. In this way, the chat provider gets to know what customers really want and value. This is valuable data. The chat provider can use this information to plug into an advertising engine to better target the users by the analysis of these linkages.

The stock ticker for each personality is a fun/paradigm shift. This will evolve into the stock market for the IM space auctions. In one embodiment, the IM stock ticker showing only the IM price for that individual will run along the bottom of the IM chat window while in session. In another embodiment, the stock ticker will include the going rates for all of the buddies. The buddies are the default choices. If there is interest in the IM of a non-buddy, the user must log in to the IM bidding site and propose the non-buddy. This will help in tracking the interests of the user and tracking the bidding profiles. The stock ticker can also be accessed via a mobile app where one can go to a website to view the ticker and also to upload his/her own buddy name to be included.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Therefore, while there has been described what is presently considered to be the preferred embodiment, it will understood by those skilled in the art that other modifications can be made within the spirit of the invention. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

I claim:

1. A method for monetizing an on-line communication, the method comprising:

using a processor device, performing acts comprising:

receiving a request associated with a first instant message account holder associated with expertise in a first topic;

assigning a price to become an instant message buddy of the first instant message account holder using current trending data, wherein assigning the price comprises assigning a first price as the assigned price responsive to the current trending data indicating that a current time is associated with a first characteristic corresponding to the first topic and assigning a second price less than the first price as the assigned price responsive to the current trending data indicating that the current time is not associated with the first characteristic;
providing, to a user, an instant message board comprising a list of instant message buddies, a message space for receiving messages and inputting messages, and a ticker tape displaying the assigned price to become an instant message buddy of the first instant message account holder and a first indicator of whether the assigned price is increasing or decreasing, and a third price to become an instant message buddy of a second instant message account holder and a second indicator of whether the third price is increasing or decreasing;
responsive to receiving a selection of at least part of the ticker tape:
providing a graphical user interface for bidding on instant message space associated with at least one of the first instant message account holder or the second instant message account holder;
providing a first input tool on the graphical user interface enabling the user to select an instant message account holder from a plurality of instant message account holders including the first instant message account holder responsive to the first instant message account holder being represented in the ticker tape and the second instant message account holder responsive to the second instant message account holder being represented in the ticker tape; and
providing a second input tool on the graphical user interface enabling the user to submit a bid offer different from an initial price associated with the instant message account holder;
receiving a selection of the instant message account holder via the first input tool and the bid offer via the second input tool from the user; and
transmitting the bid offer to the instant message account holder such that the instant message account holder can accept or decline the bid offer.

2. The method of claim 1 the ticker tape displaying a fourth price to become an instant message buddy of a third instant message account holder and a third indicator of whether the fourth price is increasing or decreasing.

3. The method of claim 1 comprising:
responsive to receiving a request to search a database of instant message buddies, providing a web page comprising a search bar and a search button;
responsive to receiving a selection of the search button, searching the database of instant message buddies based upon text received via the search bar; and
responsive to receiving a request for trending data corresponding to a searched instant message account holder, providing a second web page comprising a graph displaying pricing information associated with the searched instant message account holder over a period of time.

4. The method of claim 1 comprising responsive to receiving a request to search a database of instant message buddies, providing a web page comprising a search bar and a search button.

5. The method of claim 1 comprising searching a database of instant message buddies based upon text received via a search bar.

6. The method of claim 1 comprising receiving a request for trending data corresponding to a searched instant message account holder.

7. The method of claim 6 comprising responsive to receiving the request for trending data corresponding to the searched instant message account holder, providing a second web page comprising a graph displaying pricing information associated with the searched instant message account holder over a period of time.

8. The method of claim 7 the graph displaying pricing information associated with the searched instant message account holder over a period of time.

9. The method of claim 1 comprising:
calculating bidding patterns of instant message space of one or more instant message account holders; and
using the bidding patterns to provide the current trending data.

10. An information processing system for monetizing on-line communications, comprising:
a processor device; and
a memory with computer-executable instructions stored therein, the computer-executable instructions, when executed by the processor device, performing operations comprising:
assigning a price to become an instant message buddy of a first instant message account holder associated with expertise in a first topic using current trending data, wherein assigning the price comprises assigning a first price as the assigned price responsive to the current trending data indicating that a current time is associated with a first characteristic corresponding to the first topic and assigning a second price less than the first price as the assigned price responsive to the current trending data indicating that the current time is not associated with the first characteristic;
providing at a first time, to a first user, a first instance of an instant message board comprising a first instance of a list of instant message buddies, a first instance of a message space for receiving messages and inputting messages, and a first instance of a ticker tape displaying the assigned price to become an instant message buddy of the first instant message account holder and a first indicator of whether the assigned price is increasing or decreasing, and a third price to become an instant message buddy of a second instant message account holder and a second indicator of whether the third price is increasing or decreasing, the first instance of the ticker tape not displaying a price to become an instant message buddy of a third instant message account holder;
responsive to receiving a selection of at least part of the first instance of the ticker tape:
providing a first instance of a graphical user interface for bidding on instant message space associated with at least one of the first instant message account holder or the second instant message account holder; and
providing a first instance of a first input tool on the first instance of the graphical user interface enabling the first user to select an instant message account holder from a plurality of instant message account holders including the first instant message account holder and the second instant message account holder but not including the third instant message account holder;
providing at a second time, to a second user, a second instance of the instant message board comprising a second instance of the list of instant message buddies, a second instance of the message space for receiving messages and inputting messages, and a second instance of the ticker tape displaying a fourth price to become an instant message buddy of the second instant message account holder and a third indicator of whether the fourth price is increasing or decreasing, and a fifth price to become an instant message buddy of the third instant message account holder and a fourth indicator of whether the fifth price is increasing or decreasing, the second instance of the ticker tape not displaying a price to become an instant message buddy of the first instant message account holder; and responsive to receiving a selection of at least part of the second instance of the ticker tape:

providing a second instance of the graphical user interface for bidding on instant message space associated with at least one of the second instant message account holder or the third instant message account holder; and providing a second instance of the first input tool on the second instance of the graphical user interface enabling the second user to select an instant message account holder from a plurality of instant message account holders including the second instant message account holder and the third instant message account holder but not including the first instant message account holder.

11. The information processing system of claim 10 the first user different than the second user.

12. The information processing system of claim 10 the first user the same as the second user.

13. The information processing system of claim 10 the third price different than the fourth price.

14. The information processing system of claim 10 the third price the same as the fourth price.

15. The information processing system of claim 11 the first instance of the list of instant message buddies different than the second instance of the list of instant message buddies.

16. The information processing system of claim 12 the first instance of the list of instant message buddies the same as the second instance of the list of instant message buddies.

17. The information processing system of claim 10 the operations comprising searching a database of instant message buddies based upon text received via a search bar.

18. The information processing system of claim 10 the operations comprising responsive to receiving a request to search a database of instant message buddies, providing a web page comprising a search bar and a search button.

19. The information processing system of claim 10 the operations comprising:

receiving a request for trending data corresponding to a searched instant message account holder; and responsive to receiving the request for trending data corresponding to the searched instant message account holder, providing a second web page comprising a graph displaying pricing information associated with the searched instant message account holder over a period of time, the graph displaying pricing information associated with the searched instant message account holder over a period of time.

20. A computer program product comprising a non-transitory computer-readable storage medium with computer-executable instructions stored therein, the instructions causing a computer to perform:

receiving a request associated with a first instant message account holder associated with expertise in a first topic;

assigning a price to become an instant message buddy of the first instant message account holder using current trending data, wherein assigning the price comprises assigning a first price as the assigned price responsive to the current trending data indicating that a current time is associated with a first characteristic corresponding to the first topic and assigning a second price less than the first price as the assigned price responsive to the current trending data indicating that the current time is not associated with the first characteristic;

providing, to a user, an instant message board comprising a list of instant message buddies, a message space for receiving messages and inputting messages, and a ticker tape displaying the assigned price to become an instant message buddy of the first instant message account holder and a first indicator of whether the assigned price is increasing or decreasing, and a third price to become an instant message buddy of a second instant message account holder and a second indicator of whether the third price is increasing or decreasing; and responsive to receiving a selection of at least part of the ticker tape:

providing a graphical user interface for bidding on instant message space associated with at least one of the first instant message account holder or the second instant message account holder;

providing an input tool on the graphical user interface enabling the user to submit a bid offer associated with at least one of the first instant message account holder or the second instant message account holder; and automatically populating the input tool with a current price associated with at least one of the first instant message account holder or the second instant message account holder.

* * * * *